(12) United States Patent
Chen et al.

(10) Patent No.: US 12,076,664 B2
(45) Date of Patent: Sep. 3, 2024

(54) ALKYL ETHER AMINE FOAM CONTROL COMPOUNDS AND METHODS OF PROCESSING FOODSTUFFS

(71) Applicant: Dow Global Technologies LLC, Midland, MI (US)

(72) Inventors: Xue Chen, Lake Jackson, TX (US); Stephen W. King, Lake Jackson, TX (US); Felipe A. Donate, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 58 days.

(21) Appl. No.: 17/280,138

(22) PCT Filed: Sep. 17, 2019

(86) PCT No.: PCT/US2019/051424
§ 371 (c)(1),
(2) Date: Mar. 25, 2021

(87) PCT Pub. No.: WO2020/068481
PCT Pub. Date: Apr. 2, 2020

(65) Prior Publication Data
US 2021/0339171 A1  Nov. 4, 2021

Related U.S. Application Data

(60) Provisional application No. 62/738,393, filed on Sep. 28, 2018.

(51) Int. Cl.
*B01D 19/04* (2006.01)
*A23L 5/00* (2016.01)
(Continued)

(52) U.S. Cl.
CPC ............ *B01D 19/0413* (2013.01); *A23L 5/00* (2016.08); *A23L 19/09* (2016.08); *A23L 19/12* (2016.08);
(Continued)

(58) Field of Classification Search
CPC ....... B01D 19/0413; A23L 19/12; A23L 5/00; A23L 19/09; A23N 12/023; A23V 2002/00
(Continued)

(56) References Cited

U.S. PATENT DOCUMENTS 3,076,768 A  2/1963 Boylan
3,666,681 A  5/1972 Keil
(Continued)

FOREIGN PATENT DOCUMENTS

CN  107075067 A  8/2017
CN  107936939 A  4/2018
(Continued)

*Primary Examiner* — Changqing Li
(74) *Attorney, Agent, or Firm* — Kagan Binder, PLLC

(57) ABSTRACT

Alkyl ether amines are used as foam control compounds in foodstuff processing. The alkyl ether amines can be used at various stages during industrial processing of vegetables, fruits, and plants, such as potatoes and beets. The alkyl ether amines are generally of lower molecular weights and therefore easily transported to the foam layer to break the foam structure. Further, the alkyl ether amines are water soluble and therefore can be readily removed from the food processing system.

25 Claims, 2 Drawing Sheets

(51) Int. Cl.
  *A23L 19/00* (2016.01)
  *A23L 19/12* (2016.01)
  *A23N 12/02* (2006.01)
(52) U.S. Cl.
  CPC ........ *A23N 12/023* (2013.01); *A23V 2002/00* (2013.01)
(58) Field of Classification Search
  USPC .......................................... 426/564, 534, 654
  See application file for complete search history.

(56) References Cited

U.S. PATENT DOCUMENTS

| | | |
|---|---|---|
| 3,697,659 A | 10/1972 | Marco |
| 3,990,905 A * | 11/1976 | Wachala ............... C13B 10/003 |
| | | 516/131 |
| 5,356,636 A | 10/1994 | Schneider et al. |
| 5,725,815 A | 3/1998 | Wollenweber et al. |
| 9,255,220 B2 | 2/2016 | Falana et al. |
| 9,574,126 B2 | 2/2017 | Gamble et al. |
| 10,351,800 B2 | 7/2019 | Prasad |
| 10,414,856 B2 | 9/2019 | Ebert et al. |
| 2003/0079761 A1 | 5/2003 | Rich |

FOREIGN PATENT DOCUMENTS

| | | |
|---|---|---|
| EP | 1 277 829 A2 | 1/2003 |
| JP | H08-507718 A | 8/1996 |
| JP | 2003-080006 A | 3/2003 |
| JP | 2014080476 A | 5/2014 |
| JP | 2018-510960 A | 4/2018 |
| WO | 2014/004193 A1 | 1/2014 |
| WO | 2014/099466 A1 | 6/2014 |
| WO | 2015/143034 A1 | 9/2015 |

* cited by examiner

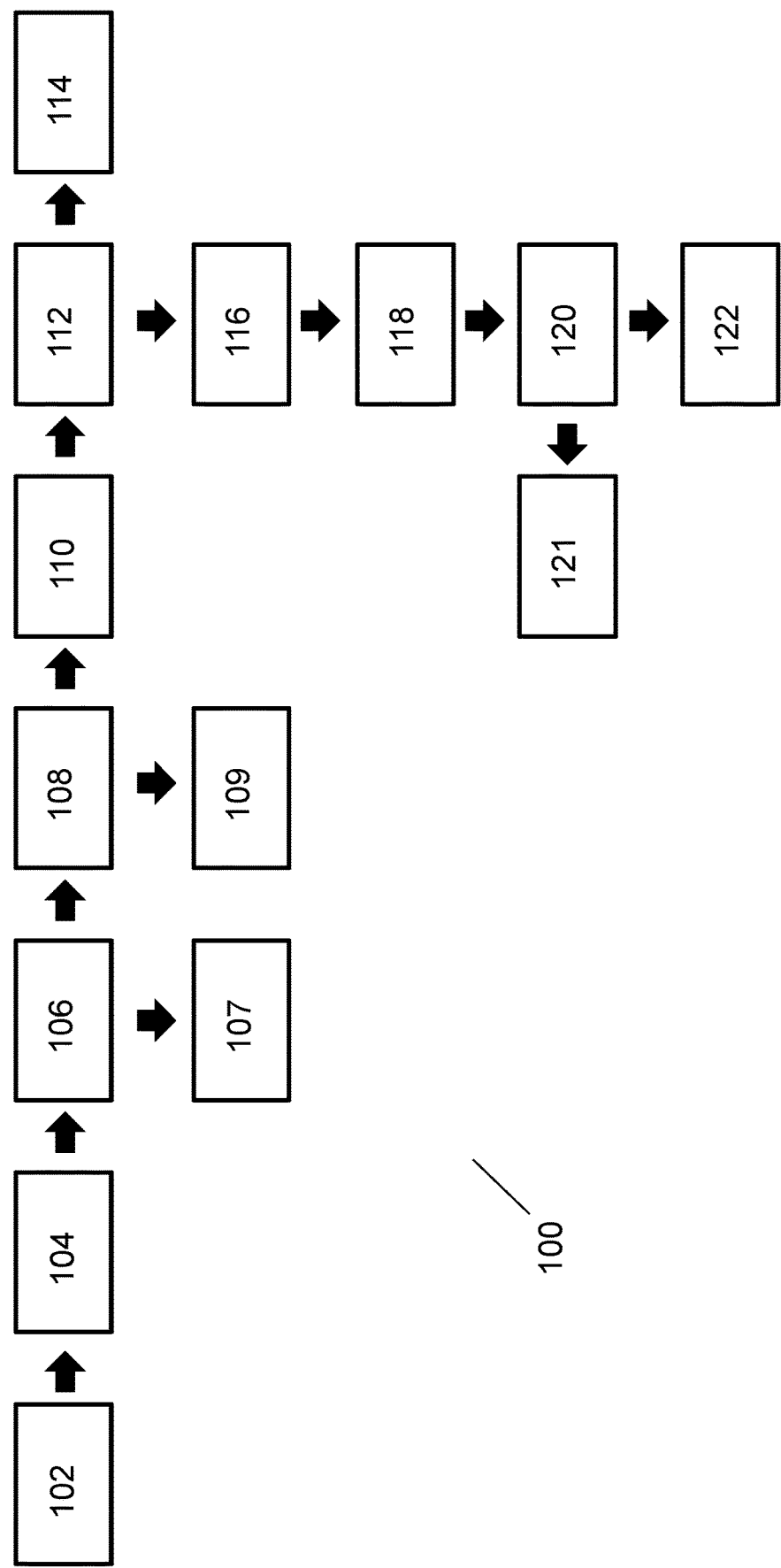

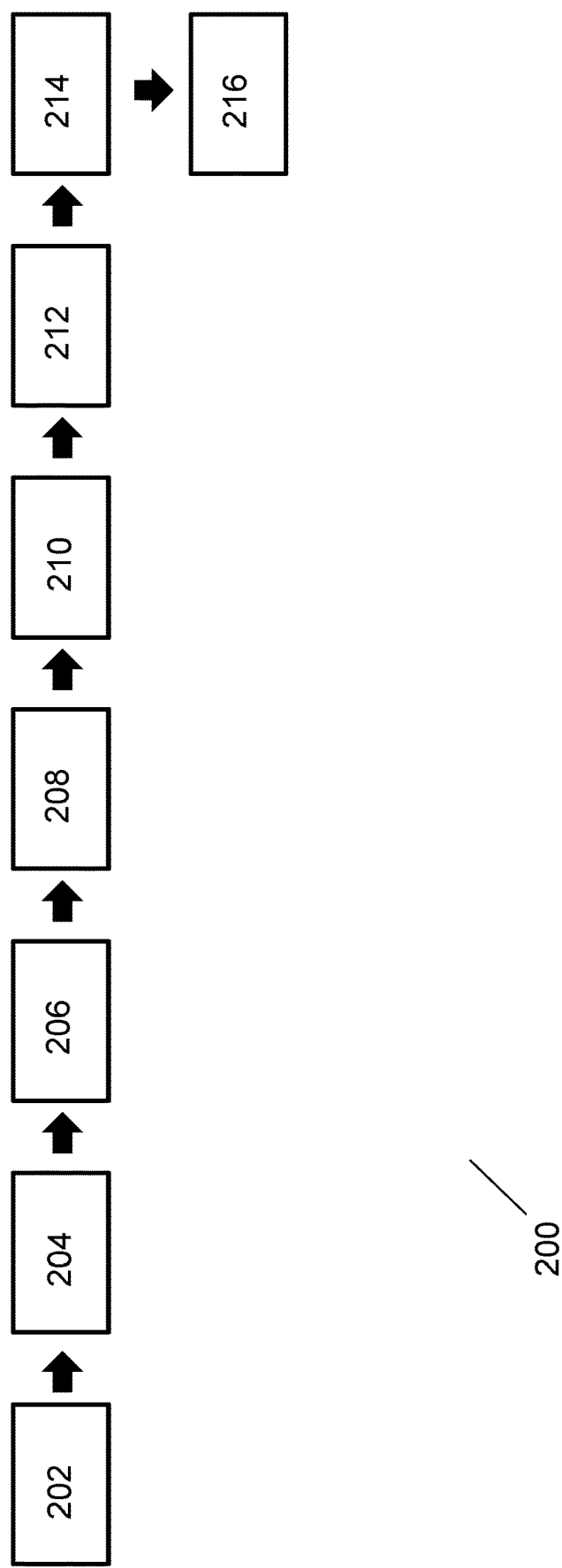

ALKYL ETHER AMINE FOAM CONTROL COMPOUNDS AND METHODS OF PROCESSING FOODSTUFFS

RELATED APPLICATIONS

The present Application claims priority to International Application No. PCT/US2019/051424, filed Sep. 17, 2019, which claims priority to commonly owned U.S. provisional Application No. 62/738,393, filed on Sep. 28, 2018, wherein the contents of said applications are incorporated herein by reference in their entireties.

BACKGROUND

The processes for manufacturing foodstuffs occasionally cause unwanted foam generation. Mechanical methods of foam management have limited effectiveness. Instead, foam control agents are added to the manufacturing process to reduce foam generation. For food and pharma applications, traditional foam control agents include ethylene oxide-based, propylene oxide-based and silicone-based agents. However, there remains a strong demand for improved foam control agents that are suitable for use in the food industry.

Foam control agents include foam inhibitors that prevent the formation of foam (antifoamers), and defoamers that reduce foam after it is formed.

Undesirable foam formation can occur at various processing stages during the processing of a vegetable, fruit, or plant foodstuff. For example, during industrial processing of sugar beet (such as leading to formation of sugar, syrups, and juices), foam formation can occur in processing equipment during washing, cutting, diffusing, carbonizing, and evaporation steps. Likewise, during industrial processing of potatoes, foam formation can occur in processing equipment during washing, cleaning, polishing, and cutting. Yet other processes using foodstuffs where foam control is desirable includes industrial fermentation processes, including fermentation for the producing of nutraceuticals and pharmaceuticals.

Foam control agents desirably do not have an adverse effect on the industrial processes they are used in to control foam, including adverse effects on microorganisms used in industrial fermentation of foodstuffs. Since foam control agents may in some instances become present in the end product of the foodstuff processing procedure, it is desirable that they are physiologically safe.

SUMMARY

Aspects of the current invention are directed to methods for controlling foam during foodstuff processing using alkyl ether amines, food product precursor compositions including alkyl ether amine foam control compounds, and systems for processing foodstuffs configured for using alkyl ether amines and controlling foam formation.

In one aspect, the invention provides a method for controlling foam while processing a foodstuff, the method including steps of (a) forming a composition comprising a foodstuff and a compound that has a number of carbon atoms in the range of 3 to 34, a number of ether oxygens in the range of 1 to 6, and an amine moiety, and (b) processing the composition.

The compound of the composition can be a compound of Formula I:

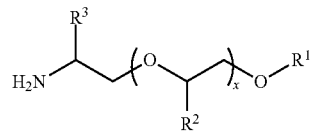

wherein $R^1$ is a monovalent carbon-containing group having 1 to 10 carbon atoms; $R^2$ is hydrogen, methyl, or ethyl; $R^3$ is hydrogen, methyl, or ethyl; and x is 0 to 5.

In another aspect, the invention provides a food product precursor composition that includes a foodstuff; and (a) a compound that has a number of carbon atoms in the range of 3 to 34, a number of ether oxygens in the range of 1 to 6, and an amine moiety; or (b) a compound of Formula I as described herein.

In another aspect, the invention provides a system for processing a foodstuff according to any of the methods of the disclosure, wherein the system includes (a) a foodstuff processor capable of one or more of washing, cutting, chopping, grating, slicing, peeling, julienning, mincing, dicing, shredding, blending, pureeing, beating, liquidizing, mashing, whisking, crushing, juicing, grinding, and fermenting a foodstuff to a processed foodstuff; (b) a container configured to hold an aqueous composition comprising the processed foodstuff, water, and a foam control compound of the disclosure, and (c) a separator mechanism capable of separating the foam control compound from the processed foodstuff.

The methods, compositions, and systems that use the alkyl ether amine foam control compounds of the disclosure can be used for the processing of various types of plants, fruits, or vegetables, such as those that include substantial amounts of starch, such as potatoes, or substantial amounts of saponin, such as beets. Release of starch and saponin from these foodstuffs can otherwise cause formation of foam, which is controlled using the alkyl ether amines of the disclosure.

Alkyl ether amines of the disclosure provide certain advantages over other conventional foam control agents. Since they are generally lower in molecular weight compared to silicon-based and EO/PO copolymers they can more easily transport to the foam layer to break foam. In addition, alkyl ether amines foam control compounds of the disclosure can be removed from the food processing system since they have very good solubility in water.

BRIEF DESCRIPTION OF THE DRAWINGS

FIG. 1 is a schematic diagram illustrating steps in the industrial processing of sugar beets.

FIG. 2 is a schematic diagram illustrating steps in the industrial processing of potatoes.

DETAILED DESCRIPTION

The present disclosure describes methods, compositions, and systems for controlling foam. The methods, compositions, and systems described herein are particularly relevant to food processing applications. During food-processing foam can be generated at various points in the production process. The foam is caused by the presence of surface-active substances such as proteins, fatty acids, polysaccharides such as starch, saponins, and sugars when aeration (generated for example by mechanical agitation, mixing, washing, extraction, stirring, sparging, etc.) occurs during processing. Foam impairs the food processing process in many different ways and greatly disrupts the process flow. The methods described herein are effective in limiting the amount of foam generated in a food processing application as compared to a similar food process where the methods described herein are not used. Without being limited by theory, it is expected that the methods of the present disclosure have features that both (1) limit the amount of foam generated in a food process (also known as anti-foam agents) and (2) minimize or eliminate generated foams (also known as defoaming agents). The food composition and the foam control compound are combined as is known in the art, for example, by mixing.

Foam control compounds of the disclosure can be used at a single point in a food processing operation, or can be used at more than one point during the procedure. For example, the industrial processing of some vegetable, fruits, or plants can involve processing steps such as washing, peeling, size reduction (e.g., cutting, shredding, blending, etc.), diffusion, extraction, and fermentation. Alkyl ether amine foam control compounds of the disclosure can be used in any one or more of these particular processing steps, and formulated as desired in compositions suitable for each type of processing event.

Foam control compounds of the disclosure include alkyl ether amine chemistries. Foam control compounds that are alkyl ether amines can include carbon atoms, hydrogens, ether oxygens, and an amine group. In embodiments, the alkyl ether amines can consist of carbon atoms, hydrogens, ether oxygens, and an amine group. Exemplary alkyl ether amines can have a number of carbon atoms in the range of 3 to 34, a number of ether oxygens in the range of 1 to 6, and an amine moiety. In more specific embodiments, the alkyl ether amines have a number of carbon atoms in the range of 4 to 10, a number of ether oxygens in the range of 1 to 3, and an amine moiety.

Preferably the amine moiety is a primary amine moiety.

Foam control compounds that are alkyl ether amines can also be described with reference to Formula I. In embodiments, the foam control compound is a compound of Formula I:

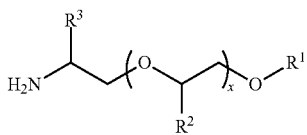

wherein $R^1$ is a monovalent carbon-containing group having 1 to 10 carbon atoms; $R^2$ is hydrogen, methyl, or ethyl; $R^3$ is hydrogen, methyl, or ethyl; and x is 0 to 5. If x is 2 or greater, $R^2$ can be the same or different (i.e., the compound can include a combination of two or more of hydrogen, methyl, and ethyl).

Exemplary $R^1$ groups include linear, branched, and cyclic alkyl groups such methyl, ethyl, propyl, isopropyl, butyl, isobutyl, sec-butyl, tert-butyl, pentyl, hexyl, 1-, 2-, and 3-methylbutyl, 1,1-, 1,2-, or 2,2-dimethylpropyl, 1-ethylpropyl, 1-, 2-, 3-, or 4-methylpentyl, 1,1-, 1,2-, 1,3-, 2,2-, 2,3-, or 3,3-dimethylbutyl, 1- or 2-ethylbutyl, 1-ethyl-1-methylpropyl, and 1,1,2- or 1,2,2-trimethylpropyl, heptyl, octyl, nonyl, decyl, cyclopentyl, methylcyclopentyl, cyclohexyl, methylcyclohexyl, ethylcyclohexyl, and propylcyclohexyl.

More specifically, the foam control compounds are defined by one or more of the following: $R^2$ is methyl, $R^3$ is methyl, and/or x is 0, 1, or 2.

In some embodiments, the alkyl ether amine foam control compound is a compound selected from any of the following groups:
(a) 2-methoxyethylamine, 2-ethoxyethylamine, 2-propoxyethylamine, 2-butoxyethylamine, 2-pentyloxyethylamine, 2-hexyloxyethylamine, 2-septy loxyethylamine, and 2-octyloxyethylamine;
(b) 1-methoxypropan-2-amine, 1-ethoxypropan-2-amine, 1-propoxypropan-2-amine, 1-butoxypropan-2-amine, 1-pentyloxy propan-2-amine, 1-hexyloxypropan-2-amine, 1-septyloxypropan-2-amine, and 1-octyloxypropan-2-amine;
(c) 2-(2-methoxyethoxy)-1-aminoethane, 2-(2-ethoxyethoxy)-1-aminoethane, 2-(2-propoxy ethoxy)-1-aminoethane, 2-(2-butoxyethoxy)-1-aminoethane, 2-(2-pentyloxyethoxy)-1-aminoethane, and 2-(2-hexyloxyethoxy)-1-aminoethane;
(d) 1-(1-methoxyethoxy)-propan-2-amine, 1-(1-ethoxyethoxy)-propan-2-amine, 1-(1-propoxyethoxy)-propan-2-amine, 1-(1-butoxyethoxy)-propan-2-amine, 1-(1-pentyloxyethoxy)-propan-2-amine, and 1-(1-hexyloxyethoxy)-propan-2-amine;
(e) 1-((1-methoxypropan-2-yl)oxy)-propan-2-amine, 1-((1-ethoxypropan-2-yl)oxy)-propan-2-amine, 1-((1-propoxypropan-2-yl)oxy)-propan-2-amine, 1-((1-butoxypropan-2-yl)oxy)-propan-2-amine, 1-((1-pentyloxypropan-2-yl)oxy)-propan-2-amine, and 1-((1-hexyloxypropan-2-yl)oxy)-propan-2-amine,
(f) 2-[2-(2-methoxy-ethoxy)-ethoxy]-ethylamine; 2-[2-(2-ethoxy-ethoxy)-ethoxy]-ethylamine; 2-[2-(2-propoxy-ethoxy)-ethoxy]-ethylamine; 2-[2-(2-butoxy-ethoxy)-ethoxy]-ethylamine; 2-[2-(2-pentyloxy-ethoxy)-ethoxy]-ethylamine; 2-[2-(2-hexyloxy-ethoxy)-ethoxy]-ethylamine; and
(g) 1-(((1-methoxy(propan-2-yl)oxy)-propan-2-yl)oxy)-propan-2-amine, 1-(((1-ethoxy(propan-2-yl)oxy)-propan-2-yl)oxy)-propan-2-amine, 1-(((1-propoxy(propan-2-yl)oxy)-propan-2-yl)oxy)-propan-2-amine, 1-(((1-butoxy(propan-2-yl)oxy)-propan-2-yl)oxy)-propan-2-amine, 1-(((1-pentyloxy(propan-2-yl)oxy)-propan-2-yl)oxy)-propan-2-amine, and 1-(((1-hexyloxy (propan-2-yl)oxy)-propan-2-yl)oxy)-propan-2-amine.

In embodiments, the foam control compound is a compound selected from the group consisting of:

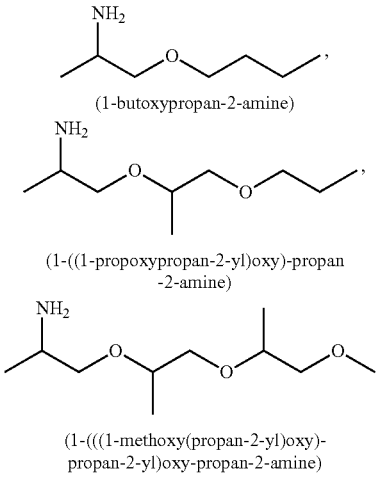

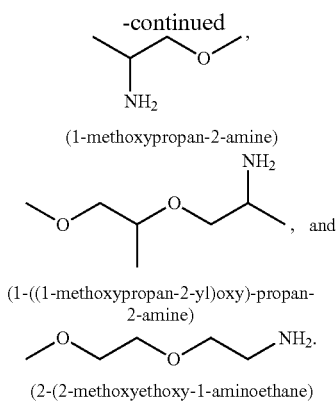

(1-methoxypropan-2-amine)

(1-((1-methoxypropan-2-yl)oxy)-propan-2-amine)

(2-(2-methoxyethoxy-1-aminoethane)

Alkyl ether amines of the disclosure can include those having boiling points (bps) in the range of about 90° C. to about 280° C.

The preparation of alkyl ether amines is known in the art, and various alkyl ether amines are also commercially available. One mode of synthesis involves the reductive amination of glycol ethers with ammonia using NiCoCuReB catalyst as described in U.S. U.S. Pat. No. 9,574,126. Glycol ether starting materials can be obtained from Dow, such as obtained under the DOWANOL™, CELLOSOLVE™, and CARBITOL™ tradenames, such as propylene glycol n-butyl ether (DOWANOL™ PnB glycol ether), dipropylene glycol methyl ether (DOWANOL DPM glycol ether), dipropylene glycol n-propyl ether (DOWANOL DPnP glycol ether), propylene glycol n-propyl ether (DOWANOL PnP glycol ether), dipropylene glycol n-butyl ether (DOWANOL DPnB glycol ether), ethylene glycol monohexyl ether (Hexyl CELLOSOLVE™ solvent), ethylene glycol mono-n-propyl ether (propyl CELLOSOLVE Solvent), diethylene glycol monohexyl ether, ethylene glycol mono-n-propyl ether (Propyl CELLOSOLVE Solvent), diethylene glycol monohexyl ether (Hexyl CARBITOL™ Solvent, diethylene glycol monobutyl ether (Butyl CARBITOL Solvent) and triethylene glycol monobutyl ether.

Some alkyl ether amines (e.g., 1-methoxypropan-2-amine, Sigma-Aldrich) are commercially available.

The alkyl ether amine foam control compound of the disclosure can be in a form configured to be added to a composition that includes a foodstuff or a product derived from a foodstuff product. For example, the alkyl ether amine foam control compound can be in the form of a liquid composition that is added to an aqueous composition that includes the foodstuff or a product derived therefrom. The alkyl ether amine per se can be in the form of a liquid at room temperature (23° C.), and therefore a "stock" composition can be one where the alkyl ether amine is in neat form (100% wt). A stock composition can also be prepared with the alkyl ether amine in one or more compatible solvents, such as where the alkyl ether amine is present in an amount in the range of about 30% (wt) to about 99% (wt). An amount of a stock or concentrated composition of the alkyl ether amine can be added to a composition that includes the foodstuff to provide the alkyl ether amine foam control compound in a working amount.

Alternatively, the alkyl ether amine foam control compound can be in the form of a solids composition, such as in powder or granule form that can be added to an aqueous composition that includes the foodstuff or a product derived therefrom.

A stock or concentrated liquid composition can further include a solvent, a surfactant, an emulsifier, or a combination thereof. The alkyl ether amine can optionally be co-solvated in such a liquid composition. An optional surfactant or emulsifier can be in an amount in the range of 0.1-30% by weight of the composition.

Exemplary optional surfactant(s) or emulsifier(s) are anionic, cationic and nonionic compounds. Examples of suitable anionic surfactants or emulsifiers are alkali metal, ammonium and amine soaps; the fatty acid part of such soaps contains preferably at least 16 carbon atoms. The soaps can also be formed "in situ;" in other words, a fatty acid can be added to the oil phase and an alkaline material to the aqueous phase.

Other examples of suitable anionic surfactants or emulsifiers are alkali metal salts of alkyl-aryl sulfonic acids, sodium dialkyl sulfosuccinate, sulfated or sulfonated oils, e.g., sulfated castor oil; sulfonated tallow, and alkali salts of short chain petroleum sulfonic acids.

Suitable cationic surfactants or emulsifiers are salts of long chain primary, secondary or tertiary amines, such as oleylamide acetate, cetylamine acetate, di-dodecylamine lactate, the acetate of aminoethyl-aminoethyl stearamide, dilauroyl triethylene tetramine diacetate, 1-aminoethyl-2-heptadecenyl imidazoline acetate; and quaternary salts, such as cetylpyridinium bromide, hexadecyl ethyl morpholinium chloride, and diethyl di-dodecyl ammonium chloride.

Examples of suitable nonionic surfactants or emulsifiers are condensation products of higher fatty alcohols with ethylene oxide, such as the reaction product of oleyl alcohol with 10 ethylene oxide units; condensation products of alkylphenols with ethylene oxide, such as the reaction product of isoctylphenol with 12 ethylene oxide units; condensation products of higher fatty acid amides with 5, or more, ethylene oxide units; polyethylene glycol esters of long chain fatty acids, such as tetraethylene glycol monopalmitate, hexaethyleneglycol monolaurate, nonaethyleneglycol monostearate, nonaethyleneglycol dioleate, tridecaethyleneglycol monoarachidate, tricosaethyleneglycol monobehenate, tricosaethyleneglycol dibehenate, polyhydric alcohol partial higher fatty acid esters such as sorbitan tristearate, ethylene oxide condensation products of polyhydric alcohol partial higher fatty acid esters, and their inner anhydrides (mannitol-anhydride, called Mannitan, and sorbitol-anhydride, called Sorbitan), such as glycerol monopalmitate reacted with 10 molecules of ethylene oxide, pentaerythritol monooleate reacted with 12 molecules of ethylene oxide, sorbitan monostearate reacted with 10-15 molecules of ethylene oxide, mannitan monopalmitate reacted with 10-15 molecules of ethylene oxide; long chain polyglycols in which one hydroxyl group is esterified with a higher fatty acid and other hydroxyl group is etherified with a low molecular alcohol, such as methoxypolyethylene glycol 550 monostearate (550 meaning the average molecular weight of the polyglycol ether). A combination of two or more of these surfactants may be used; e.g., a cationic may be blended with a nonionic or an anionic with a nonionic.

The alkyl ether amine foam control compound composition can optionally include one or more additive(s). Examples of additives include block or random copolymers of ethylene oxide/propylene oxide, butylene oxide/propylene oxide, ethylene oxide/butylene oxide, or waxes, or silicone-based materials.

The alkyl ether amine foam control compound composition can optionally include one or more secondary foam control compounds that are used in conjunction with the methods, compositions, or systems that include the alkyl ether amine foam control compound. Optional secondary foam control compounds that are different than the alkyl ether amine foam control compounds of the disclosure include one or more agents produced by the alkoxylation of alcohol(s); at least one alkyl polyglucoside (APG); foam control agents described in one or more of Assignee's U.S. patent application Ser. No. 17/295,817, filed, May 20, 2021, now U.S. Pat. No. 11,800,886, which claims priority to U.S. Provisional Patent Application No. 62/644,015, filed Mar. 16, 2018, in the name(s) of Xue Chen; U.S. patent application Ser. No. 16/636,231 filed, Feb. 3, 2020, now U.S. Pat. No. 11,478,005, which claims priority to U.S. Provisional Patent Application Ser. No. 62/644,024, filed Mar. 16, 2018, in the name(s) of Michael L. Tulchinsky; U.S. patent application Ser. No. 16/636,005 filed, Feb. 1, 2020, now U.S. Pat. No. 11,419,357, which claims priority to U.S. Provisional Patent Application Ser. No. 62/644,031, filed Mar. 16, 2018, in the name(s) of Clark H. Cummings; and U.S. patent application Ser. No. 16/363,231, filed Feb. 3, 2020, now U.S. Pat. No. 11,478,005, which claims priority to U.S. Provisional Patent Application Ser. No. 62/644,038 filed Mar. 16, 2018, in the name(s) of Stephen W. King; the disclosures of these application which are incorporated herein by reference.

Other optional secondary foam control compounds that are different than the alkyl ether amine foam control compounds of the disclosure include ketal foam control agents as described in U.S. Provisional Patent Application entitled "CYCLIC KETAL COMPOUNDS HAVING LONG SIDE CHAINS USEFUL AS FOAM CONTROL AGENTS IN THE MANUFACTURE OF FOOD AND BEVERAGE PRODUCTS" (U.S. patent application Ser. No. 16/585,514, filed Sep. 27, 2019, issued as U.S. Pat. No. 11,510,429; Tulchinsky, M., et al.); and cellulose derivative foam control agents as described in U.S. Provisional Patent Application entitled "HYDROXYETHYL CELLULOSE DERIVATIVE FOAM CONTROL AGENTS AND METHODS OF PROCESSING FOODSTUFFS" (U.S. patent application Ser. No. 17/280,150, filed Mar. 25, 2021, published as U.S. Pub. No. 2022/0001304: Chen, X., et al.); both applications filed concurrently with the present applications and their disclosures incorporated herewith in their entireties.

These optional secondary foam control agents can be used in the same composition along with the alkyl ether amine foam control agent of the disclosure at one or more points in a food processing operation, or can be used at one or more different points in a multi-step food processing operation. That is, for example, a different secondary foam control agent can be used in an upstream processing step (such as washing of a vegetable), whereas the alkyl ether amine foam control compound is used in a downstream processing step (e.g., diffusion of sugar from a vegetable pulp).

In modes of practice, the alkyl ether amine foam control compound (AEAFCC) is added to water to form an aqueous composition, wherein the aqueous composition is used with a foodstuff in one or more foodstuff processing steps to control any foam that may be generated as a result of the foodstuff and the processing conditions being used. The alkyl ether amine foam control compound can be used in any concentration, such as in the range of 0.01 to 5% (wt), or 0.1 to 1% (wt), as described herein, to control foam formation during processing. One or more other reagents can be present in the aqueous composition along with the alkyl ether amine, depending on the particular type of foodstuff processing that is being performed.

Aspects of the disclosure can optionally be described with reference to the ability of the alkyl ether amine food control compound to control foam in a composition in a processing step as compared to a composition that does not include a foam control compound, or a composition that uses a comparative compound. In an exemplary testing process, a foodstuff (such as a sugar beet) is processed (such as by blending) in an aqueous composition that includes the alkyl ether amine foam control compound, and an amount of foam generated is measured, such as by measuring foam height or foam amount (mass). This is then compared to foam generated under the same processing conditions but either using no foam control compound, or using a comparative compound. Use of the alkyl ether amine foam control compound can reduce the amount of foam formation by at least about 10%, or by at least about 20%, such as in the range of about 10% to about 95%, or about 20% to about 95%, as compared to a composition that does not include a foam control compound.

As used herein, a "foodstuff" refers to material that is edible or drinkable, or a material that can be processed into an edible or drinkable material. A foodstuff generally is used to refer to any material that is used in combination with a composition that includes the alkyl ether amine foam control compound.

An "intermediate foodstuff" or a "precursor foodstuff" can refer to a foodstuff that is processed in a first step using a composition that includes the alkyl ether amine foam control compound, but that is subjected to further processing in a second step, wherein the second step is another processing step that either produces an edible or drinkable food product, or a precursor thereof. An example of an intermediate or precursor foodstuff is a peeled potato which is peeled in the presence of the foam control compound, wherein the peeled potato is used in a second processing step that involves cutting or grating the potato into edible portions such as French fry portions, or potato flakes, and these further processed portions can be considered "food products." An "ingredient foodstuff," which can also be an intermediate or precursor foodstuff, refers to a foodstuff that is processed from a composition that includes the alkyl ether amine foam control compound, and that is subsequently used in a foodstuff product, such as a food or beverage product. An example of an ingredient foodstuff can be sugar, such as from a sugar beet obtained using methods of the disclosure. However, sugar, such as packaged for direct consumption, can also be a food product per se. Sugar and starch foodstuffs obtained using methods of the disclosure can also be used in fermentation methods such as to provide fermented products such as fermented beverages, biofuels, and pharmaceuticals, which can be referred to herein as "foodstuff derivatives," which may or may not be edible or drinkable food products. Foodstuffs include, but are not limited to, edible plants, vegetables, fruits, and grains, and derivatives of edible plants, vegetables, fruits, and grains that are formed when these foods are subject to processing using methods of the disclosure.

Some foodstuffs that are commonly subject to processing include plants, vegetables, and fruits that have starch. Methods of the disclosure can be used to process plants, vegetables, and fruits include those having a starch content of greater than 0.01% (wt), greater than 0.1% (wt), or greater than 1.0% (wt).

Some foodstuffs that can be processed according to methods of the disclosure include starch in an amount in the range of 0.01% to 30% wt, non-starch carbohydrate in an amount in the range of 0.01% to 80% wt, protein in an amount in an amount in the range of 0.01% to 20% wt, and water in an amount in the range of 20% to 95% wt.

Higher starch content plants, vegetables, and fruits can have starch contents of greater than 2.5% (wt), about 5% (wt) or greater, about 7.5% (wt) or greater, or even about 10% (wt) or greater, such as in the range of about 5% to about 25% (wt), or about 10% to about 25% (wt). Use of the alkyl ether amine food control compound of the disclosure can be useful for controlling foam during the processing of these plants, vegetables, and fruits, which can release starch into an aqueous processing composition and otherwise cause undesirable foam formation.

Various plants, vegetables, and fruits have high start content, and can be used in methods of the disclosure along with the alkyl ether amine foam control compound. For example, in some modes of practice, the starch-containing foodstuff is, or is derived from, a vegetable or plant selected from the group consisting of peas, corn, potatoes, beans, rice, wheat, cassava, beans, sweet potatoes, yams, sorghum, and plantain.

High-content starch foodstuffs may also be defined in terms of other components that constitute the food. For example, methods of the disclosure can also use a plant, vegetable, or fruits comprises starch in an amount in the range of 5% to 25% wt, non-starch carbohydrate in an amount in the range of 0.01% to 10% wt, protein in an amount in an amount in the range of 0.01% to 10% wt, and water in an amount in the range of 50% to 95% wt, or starch in an amount in the range of 10% to 20% wt, non-starch carbohydrate in an amount in the range of 0.1% to 5% wt, protein in an amount in an amount in the range of 0.1% to 5% wt, and water in an amount in the range of 70% to 90% wt.

Some foodstuffs that are commonly subject to processing include plants, vegetables, and fruits that have saponin. Saponins are chemically defined as amphipathic glycosides structurally having one or more hydrophilic glycoside moieties attached to a lipophilic triterpene moiety. Use of the alkyl ether amine food control compound of the disclosure can be useful for controlling foam during the processing of these plants, vegetables, and fruits, which can release saponin into an aqueous processing composition and otherwise cause undesirable foam formation. Methods of the disclosure can be used to process plants, vegetables, and fruits include those having a saponin content of greater than 1 ppm. High saponin content plants, vegetables, and fruits include those having a saponin content of greater than 0.001% (wt) (10 ppm), about 0.005% (wt) (50 ppm) or greater, or about 0.01% (wt) (100 ppm) or greater, such as in the range of about 0.005% (wt) to about 0.2% (wt), or such as in the range of about 0.01% (wt) to about 0.2% (wt). Saponins are reported to be found in sugar beet at levels of 0.01% to 0.2% of beet. (See, for example, Hallanoro, H., et al. (1990). Saponin, a cause of foaming problems in beet sugar production and use. *Proc. Conf. Sugar Proc. Res.*, pp. 174-203; Earl J. Roberts, Margaret A. Clarke* and Mary An Godshall, SUGARBEET SAPONINS AND ACID BEVERAGE FLOC; Sugar Processing Research Institute, Inc., 1100 Robert E. Lee Blvd., New Orleans, LA, USA 70124.)

Saponin content in various plants, vegetables, and fruits have been studied, and AEAFCC such food stuffs can be used in methods of the disclosure along with the alkyl ether amine foam control compound. For example, in some modes of practice, the saponin-containing foodstuff is, or is derived from, a vegetable or plant selected from the group consisting of peas, corn, potatoes, beans, rice, wheat, cassava, beans, sweet potatoes, yams, sorghum, and plantain.

Saponin-containing foodstuffs may also be defined in terms of other components that constitute the food. For example, methods of the disclosure can also use a plant, vegetable, or fruits comprise saponin in an amount in the range of 1 ppm to 5% (wt), starch in an amount in the range of 0.01% to 30% (wt), non-starch carbohydrate in an amount in the range of 0.01% to 80% (wt), protein in an amount in an amount in the range of 0.01% to 20% (wt), and water in an amount in the range of 20% to 95% (wt).

"Foodstuff processing" refers to a physical or chemical action that treats a foodstuff. In some cases, foodstuff processing is, or includes, a cleaning or washing procedure, or a diffusing procedure. For example, foodstuff processing that uses a cleaning or washing procedure can use a composition, such as an aqueous composition, that includes the alkyl ether amine foam control compound and a foodstuff, such as a plant, vegetable, or fruit, in a whole or substantially whole form. A cleaning or washing procedure can utilize a cleaning or washing apparatus, such as a tub, tank, bin, or container that is able to hold an aqueous composition having the alkyl ether amine foam control compound and whole or portions of the plant, vegetable, or fruit. The cleaning or washing apparatus can further include one or more optional features such as an agitator, a mixer, or similar device to cause the movement of the plant, vegetable, or fruit therein thereby causes cleaning by movement of the foodstuff and the aqueous composition. The cleaning or washing apparatus can further include brushes or sprayers to facilitate removal of debris, such as dirt, waxes, residues, microorganisms, or other undesirable material, from the plant, vegetable, or fruit. The cleaning or washing apparatus can further include a feature, such as a strainer, sieve, filter, grate, colander, that facilitates separation of the washed or cleaned foodstuff from the aqueous composition containing the alkyl ether amine foam control compound. For example, see FIG. 9 of U.S. Pat. No. 2,838,083 (the disclosure of which is incorporated herein by reference), which describes a vegetable peeler and cleaner (e.g., for potato) having spray disperser, abrasive surface of disk 50 to remove skin of the potato, and basket or strainer 185 for potato portions.

During the cleaning or washing procedure, the alkyl ether amine can prevent and/or reduce formation of foam that may otherwise result from release of components (e.g., starches, saponin) from the plant, vegetable, or fruit into the aqueous wash composition. An aqueous wash or cleaning composition can include the alkyl ether amine at a desired concentration, such as in the range of 0.01 to 5% (wt), or in the range of 0.1 to 1% (wt) in the aqueous wash composition. An aqueous wash or cleaning composition can optionally include one or more other reagents such as surfactant(s), antimicrobial agents, acid(s), oxidant(s), buffer(s), etc. The aqueous wash or cleaning composition can be used in a desired amount relative to the foodstuff being washed or cleaned. For example, the aqueous wash or cleaning composition is desirably at least about 20% of the composition that includes the foodstuff and the aqueous liquid portion including alkyl ether amine foam control compound. Typically, a cleaning or washing process uses aqueous liquid portion in an amount in the range of 25-90% (wt), and a foodstuff portion in an amount in the range of 10-75% (wt). Washing can be performed for a desired period of time at a desired temperature to ensure that the foodstuff is properly cleaned and desired properties (e.g., organoleptic) of the foodstuff are maintained. Generally, during cleaning or washing procedure a foodstuff is not processed into smaller portions.

In modes of practice, following a washing or cleaning procedure, the foodstuff can be subjected to one or more other food processing procedures (e.g., "downstream procedures") that use a alkyl ether amine antifoam compound. Such downstream procedures include, but are not limited to size portion processing, diffusion/extraction, blending/homogenizing, evaporation, and/or fermentation.

In some cases, foodstuff processing is, or includes, a procedure that physically reduces the size (size processing) of the foodstuff from a larger (e.g., original) size, to a plurality of smaller sizes. In some cases the plurality of smaller sizes that are formed by processing can be described with reference to the size of the pre-processed foodstuff (e.g., a whole potato or sugar beet). For example, the foodstuff, prior to processing, has an original, unprocessed, size, and processing comprises a mechanical action that reduces the original size of the foodstuff to foodstuff portions of sizes that are not less than are not less than 1%, not less than 10%, or not less than 50% of the original size. Alternatively, such processing can be described with reference to weights of the processed foodstuff, for example where the processed foodstuff portions have sizes that are not less than are not less than 1 gram, or not less than 5 grams.

Examples of processing techniques that can be used to generate processed foodstuff portions of such sized include cutting, chopping, grating, slicing, peeling, julienning, mincing, dicing, diffusing, and shredding. Examples of portions of foodstuffs that are formed can be plant, vegetable, and fruit chunks, slices, chips, flakes, shreds, and cubes. These types of smaller portions of foodstuffs can be made into a food product for consumption, or can be used for further downstream procedures such as diffusion/extraction, blending/homogenizing, evaporation, and/or fermentation. Foodstuff portions that are sized processed can optionally be described with reference to the shape and/or size of the foodstuff portion.

Size processing of a foodstuff can utilize apparatus having one or more features that physically reduce the size of the foodstuff from a larger size to a plurality of smaller sizes. For example, the apparatus can include one or more sharp articles such as blade(s), slicer(s), chipper(s), shredder(s), and grater(s) that are capable of cutting into a plant, vegetable, or fruit to generate smaller portions. The cutting features can be used in conjunction with one or more of a tub, tank, bin, or container to hold an aqueous composition having the alkyl ether amine foam control compound, which can provide the plant, vegetable, or fruit to be cut, or which can hold the cut plant, vegetable, or fruit, or both.

During size processing, the alkyl ether amine can prevent and/or reduce formation of foam that may otherwise result from release of components (e.g., starches, saponin) from the plant, vegetable, or fruit into an aqueous composition used in conjunction with size processing. An aqueous composition for size processing can include the alkyl ether amine at a desired concentration, such as in the range of 0.01 to 5% (wt), or in the range of 0.1 to 1% (wt). Use of the aqueous composition may beneficially reduce or prevent oxidation of the size reduced foodstuff and can also remove foodstuff-based components that are released during the size processing. Size processing can be performed for a desired period of time at a desired temperature to ensure that the foodstuff is properly cleaned and desired properties (e.g., organoleptic) of the foodstuff are maintained. Generally, during cleaning or washing procedure a foodstuff is not processed into smaller portions.

In modes of practice, following size reduction procedure, the foodstuff can be subjected to one or more other downstream procedures that use an alkyl ether amine antifoam compound. Such downstream procedures include, but are not limited to, diffusion/extraction, blending/homogenizing, evaporation, and/or fermentation.

In some cases, size processing results in foodstuff portions of sizes that are very small, such as less than 1%, less than 0.1%, less than 0.01%, or less than 0.001% of the original size of the foodstuff. Exemplary processing techniques that can produce very small portions include blending, pureeing, beating, liquidizing, mashing, whisking, crushing, juicing, and grinding. Such techniques can result in food particles sizes that are very small, such as less than 0.1 grams, less than 10 mg, less than 1 mg, or less than 100 µg. Such techniques can also result in food particles sizes that are very small, such as less than 1 mm, less than 0.1 mm, or less than 10 µm.

Size processing of a foodstuff can utilize apparatus having one or more features that physically reduce the size of the foodstuff from a larger size to a plurality of very small sizes as described herein. For example, the apparatus can include one or more sharp articles such as blender blade(s) to generate very small food product particles. These processing features can be used in conjunction with one or more of a tub, tank, bin, or container to hold an aqueous composition having the alkyl ether amine foam control compound, which can provide the plant, vegetable, or fruit to be cut, or which can hold the blended, homogenized, etc. plant, vegetable, or fruit, or both. During size processing to these very small food product particles, the alkyl ether amine can prevent and/or reduce formation of foam that may otherwise result from processing step, alkyl ether amine concentrations as described herein can be used in the aqueous composition. After processing, foodstuff solids can be separated from the aqueous portion using separation techniques such as filtration, decanting, centrifugation, etc.

In modes of practice, following such size reduction, the foodstuff particles can be subjected to one or more other downstream procedures that use an alkyl ether amine foam control compound. Such downstream procedures include, but are not limited to, diffusion/extraction, blending/homogenizing, evaporation, and/or fermentation.

In some cases, foodstuff processing is, or includes, a procedure that diffuses one or more component(s) from a foodstuff into an aqueous composition which also includes the alkyl ether amine foam control compound. The diffusion procedure can extract desired component(s) from a plant, such as sugars, which can be refined in a subsequent processing stage. Similar to a cleaning or washing, apparatus, a diffuser apparatus can include a tub, tank, bin, or container that is able to hold an aqueous composition having the alkyl ether amine foam control compound and portions of the plant, vegetable, or fruit, and also an agitator, a mixer, or similar device to cause the movement of the plant, vegetable, or fruit portion therein thereby causes cleaning by movement of the foodstuff and diffusion of the plant, vegetable, or fruit, component(s) into the aqueous composition. The process of diffusing can utilize a foodstuff that has already been processed by an upstream procedure, such as any one or more size processing procedures as described herein. That is, diffusing can use processed food stuffs ranging from larger sizes, such as chunks or slices made by cutting, to very small particles, such as made by blending. The use of foodstuff portions in the diffusing process that are smaller than the originally sized foodstuff (e.g., whole potato or beet) can improve diffusion of desired components from the food stuff to the aqueous composition that includes the foam control compound. Use of the alkyl ether amine foam control compound can control the generation of foam otherwise formed during diffusion without a foam control compound. After the diffusion process is completed, the aqueous composition can be separated from the portion(s) of the foodstuff that that are not soluble in the composition.

In some cases, foodstuff processing is, or includes, a procedure that evaporates water from a composition that includes a foodstuff (such as a processed foodstuff, or product derived from a processed foodstuff such as sugar or starch) and the foam control compound. The process of evaporation can utilize a foodstuff that has already been processed by an upstream procedure, such as any one or more size processing procedures and/or diffusion procedures as described herein. For example, the composition can include a processed foodstuff or component(s) derived from the foodstuffs, such as sugar(s) or protein(s) that are obtained in a diffusion process according to the disclosure. Evaporation can use one or more physical treatment(s) such as heat or low pressure to facilitate removal of water from the aqueous composition. An evaporation apparatus can include a container that is able to hold an aqueous composition having the food product and alkyl ether amine foam control compound, and features such as a vacuum and heater that are operated to cause evaporation of water from the composition. Use of the alkyl ether amine foam control compound can control the generation of foam otherwise formed during evaporation without a foam control compound.

Evaporation can be carried out to selectively solidify one or more desired product(s) from the composition, such as the crystallization of sugar. Various alkyl ether amines of the disclosure have boiling points (bps) in the range of about 90° C. to about 280° C., and therefore evaporation be performed to crystallize out sugar while keeping the alkyl ether amine dissolved in solution. After evaporation is completed, the foam control compound can be separated from the desired product.

In some cases, foodstuff processing is, or includes, a procedure that ferments one or more component(s) from a foodstuff in an aqueous composition which also includes the alkyl ether amine foam control agent. The fermentation procedure can include a microorganism such as bacteria or yeast that ferments one or more compound(s) from the foodstuff, such as sugar and/or starch, to a bioproduct such as ethanol, a pharmaceutical, or an industrial chemical. The process of fermentation can utilize an intermediate or precursor foodstuff that has already been processed by an upstream procedure, such as any one or more size processing procedures, diffusion, and/or evaporation procedures as described herein. A fermentation apparatus can include features such as an impellor or agitator that causes mixing of the fermentation medium, a heater, gas supply conduit(s), etc., as commonly known in the art. Use of the alkyl ether amine foam control compound can control the generation of foam otherwise formed during fermentation conditions without a foam control compound.

After fermentation, the desired bioproduct can be separated from the fermentation medium. Separation can include one or more processes such as distillation, filtration, precipitation, centrifugation, and the like. Separation can also result in the separation of the foam control compound from the desired bioproduct.

In aspects, processing the foodstuff is not a cooking process (i.e., baking, roasting, flying, grilling, etc.) which otherwise subjects the food stuff or food product to high heat. In other aspects, the composition that includes the foodstuff and the alkyl ether amine is not in the form of a dough, a flour, or a dairy product.

To illustrate the usefulness of the alkyl ether amine foam control compound (AEAFCC) in methods of processing a foodstuff, reference to FIG. 1 is made which schematically shows stages in an industrial processing 100 of a sugar beet. In stage 102 whole unprocessed beets are processed by washing in a washing tank which can include an aqueous composition with AEAFCC. After washing, the washed beets are delivered to a size processing apparatus in stage 104, such as a slicing apparatus, and are size reduced in combination with an aqueous composition with AEAFCC. In some cases, after size reduction the processed beet can exit the industrial processing and be used as a food product. Other size reduction steps can be included and are not included in FIG. 1. After size reduction, the washed beets are delivered to a diffusion tank in stage 106, wherein one or more components of the beet, such as sugars, are diffused into an aqueous composition that includes the AEAFCC. Remaining beet material, such as beet pulps which include fibers from the plant tissue, can be separated from the sugar-containing composition, as shown in stage 107, and the pulps can be used as animal feeds. The sugar-containing composition can then be subjected to one or more refinement steps in stage 108. Generation of refinement by-products can be used for agricultural purposes in stage 109. Refined sugar composition can be subjected to evaporation in stage 110 and AEAFCC can be used to control foam in this stage as well. The evaporated sugar can be subjected to crystallization and/or centrifugation in stage 112 and sent to a dryer in in stage 114. Syrups and/or sugars can also be delivered to a fermentation pathway which can involve a pre-treatment such as dilution stage 116, and then fermentation in stage 118 which uses a fermentation medium including microorganisms and AEAFCC to control foam during fermenting. The fermented medium can include one or more bioproducts which can be separated by a process such as distillation in stage 120 to AEAFCC to control foam during fermenting, and then the distilled product can be subjected to steps such as dehydration or rectification in steps 121 and 122.

As another example to illustrate the usefulness of the alkyl ether amine foam control compound (AEAFCC) in methods of processing a foodstuff, reference to FIG. 2 is made which schematically shows stages in an industrial processing 200 of a potato. In stage 202 whole unprocessed potatoes are processed by washing in a washing tank which can include an aqueous composition with AEAFCC. Potatoes can also be sorted at this stage. After washing and sorting, the potatoes are delivered to a peeling and/or polishing apparatus in stage 204, which can be carried out in combination with an aqueous composition with AEAFCC. Next, after peeling and/or polishing, the potatoes are delivered to a size reduction apparatus, such as a cutting apparatus, in stage 206, and size reduction can be carried out in combination with an aqueous composition with AEAFCC. The washed, peeled, and cut potato portions can then be subjected to various other processing steps such as chilling (stages 208 and 212), spinning/drying (stage 210), and packing (stage 214), to provide a packaged product 216.

Examples 1-6

Foam Control Performance Using Alkyl Ether Amines

Six alkyl ether amines were prepared following the procedure set forth in U.S. Pat. No. 9,574,126 using the relevant glycol ethers for the desired alkyl ether amine. The crude reaction mixture after removal of ammonia was purified by distillation. Their IUPAC and short name, CAS #(if available) and the chemical structure is given in Table 1.

TABLE 1

Nomenclature and structural formula of examples

| Example No. | Short Name | Chemical Nomenclature and structure |
|---|---|---|
| Example 1 CAS# 98433-68-2 | PnB amine | 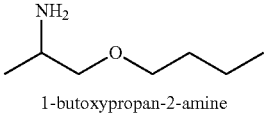<br>1-butoxypropan-2-amine |
| Example 2 CAS# 1614238-98-0 | DPnP amine | 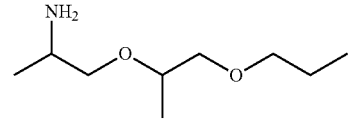<br>1-((1-propoxypropan-2-yl)oxy)propan-2-amine |
| Example 3 CAS# None | TPM amine | 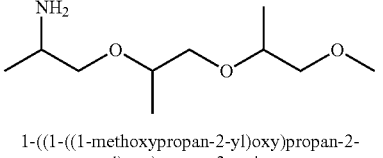<br>1-((1-((1-methoxypropan-2-yl)oxy)propan-2-yl)oxy)propan-2-amine |
| Example 4 CAS# 37143-54-7 | PM amine | 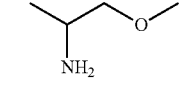<br>1-methoxypropan-2-amine |
| Example 5 CAS# 89979-85-1 | DPM amine | 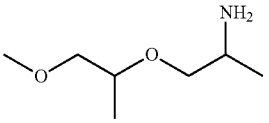<br>1-((1-methoxypropan-2-yl)oxy)propan-2-amine |
| Example 6 CAS# 31576-51-9 | DM amine | 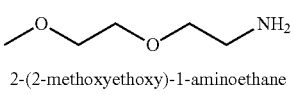<br>2-(2-methoxyethoxy)-1-aminoethane |

Foam Control Performance Evaluation

Potatoes were washed in water, peeled and sliced. 780 g of sliced potatoes and 520 g of deionized (DI) water were added to a kitchen mixer and mixed for 1 minute. A potato slurry was generated, which was filtered through filter paper and the liquid was used to evaluate the foam control compounds. This liquid is referred to as potato liquor.

Similarly, sugar beets were washed in water, peeled and sliced. 780 g of sliced sugar beets and 520 g of DI water were added to a kitchen mixer and mixed for 1 minute. A sugar beet slurry was generated, which was filtered through filter paper and the liquid was used to evaluate the foam control compounds. This liquid is referred to as sugar beet liquor. 0.5 g of examples 1-6 (Table 1) were added into 99.5 g of a liquor (potato or sugar beet) to give 100 g of material for evaluation.

100 g of a liquor without any alkyl ether amine was used as a comparative example.

A sparge tube test was utilized to evaluate the performance of alkyl ether amines as foam control compounds. The "defoaming efficiency" of a material was evaluated by measuring its effect on the foam height. 100 g of each liquid example was added separately into a 1000 ml glass cylinder with a diameter of 5 cm. A vertical gas sparging tube fitted with a sintered glass frit was placed at the cylinder bottom and air was bubbled from the bottom of the cylinder. Air flow was controlled by an Ametek Lo-Flo 0-10 Float Meter with the setting at 1. Foam heights were recorded during the first 10 minutes after air flow was applied. If a foam height reached 1000 ml within the first 10 minutes, the experiment was stopped.

Tables 2 and 3 are foam heights of sugar beet liquor and potato liquor, respectively, with and without alkyl ether amines as a function of time. As shown in the tables, for both potato liquor and sugar beet liquor the presence of alkyl ether amines (examples 1-6) in liquor, controlled the foam much better than the comparative example.

As Table 2 shows, all of the alkyl ether amines gave a lower foam height after 6 minutes for the sugar beet liquor compared to no additive (comparative example) after 1 minute. Most notable was alkyl ether amine examples 1, 5, and 6 which had a lower foam height after 10 minutes compared to 0.5 minute for the comparative example.

TABLE 2

Foam height (ml) for sugar beet liquor

| Time | comparative ex | ex 1 | ex 2 | ex 3 | ex 4 | ex 5 | ex 6 |
|---|---|---|---|---|---|---|---|
| 0.5 min | 480 | 40 | 60 | 40 | 60 | 50 | 70 |
| 1 min | 600 | 60 | 90 | 60 | 90 | 60 | 80 |
| 2 min | | 90 | 190 | 140 | 180 | 120 | 100 |
| 3 min | | 110 | 260 | 210 | 240 | 170 | 130 |
| 4 min | | 150 | 360 | 310 | 340 | 170 | 170 |
| 5 min | | 190 | 450 | 430 | 420 | 210 | 170 |
| 6 min | | 200 | 530 | 500 | 500 | 240 | 210 |
| 7 min | | 230 | 610 | 610 | 540 | 270 | 250 |
| 8 min | | 240 | 700 | 650 | 640 | 280 | 200 |
| 9 min | | 260 | 760 | 740 | 700 | 310 | 200 |
| 10 min | | 260 | 850 | 830 | 700 | 310 | 200 |

As Table 3 shows, the two alkyl ether amines gave a lower foam height after 8 minutes for the potato liquor compared to no additive (comparative example) after 1 minute. Most notable was alkyl ether amine example 1, which had a lower foam height after 10 minutes compared to 1 minute for the comparative example.

TABLE 3

Foam height (ml) property evaluation for potato liquor

| Time | comparative ex | ex 1 | ex 2 |
|---|---|---|---|
| 0.5 min | 320 | 40 | 50 |
| 1 min | 600 | 50 | 70 |
| 2 min | | 100 | 120 |
| 3 min | | 140 | 190 |
| 4 min | | 190 | 260 |
| 5 min | | 230 | 310 |
| 6 min | | 290 | 410 |
| 7 min | | 320 | 500 |
| 8 min | | 390 | 570 |
| 9 min | | 410 | 640 |
| 10 min | | 410 | 720 |

What is claimed is:
1. A method for controlling foam while processing a foodstuff, comprising:
    forming a composition comprising a foodstuff and a compound that has a number of carbon atoms in the range of 3 to 34, a number of ether oxygens in the range of 1 to 6, and an amine moiety, wherein the compound is a compound of Formula I:

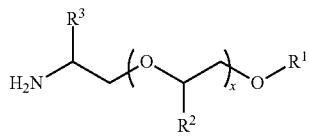

wherein $R^1$ is a monovalent carbon-containing group has a number of carbon atoms in the range of 1 to 10; $R^2$ is hydrogen, methyl, or ethyl; $R^3$ is hydrogen, methyl, or ethyl; and x is 0 to 5, wherein the composition does not include a silicon-based polymer; and processing the composition, wherein the compound controls foam while processing the composition, as compared to a composition that is the same but that does not include the compound of Formula I.

2. The method of claim 1, wherein the foam control compound has 4 to 10 carbon atoms.

3. The method of claim 1 wherein $R^1$ has a number of carbon atoms in the range of 1 to 6.

4. The method of claim 1, wherein the composition includes a plurality of compounds of Formula I such that x has an average value of 0 to 5.

5. The method of claim 1, wherein (a) $R^2$ is methyl, (b) $R^3$ is methyl, or both (a) and (b).

6. The method of claim 1, wherein x is 0, 1, or 2.

7. The method of claim 1 wherein the compound is selected from any of the following groups:
(a) 2-methoxyethylamine, 2-ethoxyethylamine, 2-propoxyethylamine, 2-butoxyethylamine, 2-pentyloxyethylamine, 2-hexyloxyethylamine, 2-septyloxyethylamine, and 2-octyloxyethylamine;
(b) 1-methoxypropan-2-amine, 1-ethoxypropan-2-amine, 1-propoxypropan-2-amine, 1-butoxypropan-2-amine, 1-pentyloxypropan-2-amine, 1-hexyloxypropan-2-amine, 1-septyloxypropan-2-amine, and 1-octyloxypropan-2-amine;
(c) 2-(2-methoxyethoxy)-1-aminoethane, 2-(2-ethoxyethoxy)-1-aminoethane, 2-(2-propoxyethoxy)-1-aminoethane, 2-(2-butoxyethoxy)-1-aminoethane, 2-(2-pentyloxyethoxy)-1-aminoethane, and 2-(2-hexyloxyethoxy)-1-aminoethane;
(d) 1-(1-methoxyethoxy)-propan-2-amine, 1-(1-ethoxyethoxy)-propan-2-amine, 1-(1-propoxyethoxy)-propan-2-amine, 1-(1-butoxyethoxy)-propan-2-amine, 1-(1-pentyloxyethoxy)-propan-2-amine, and 1-(1-hexyloxyethoxy)-propan-2-amine;
(e) 1-((1-methoxypropan-2-yl)oxy)-propan-2-amine, 1-((1-ethoxypropan-2-yl)oxy)-propan-2-amine, 1-((1-propoxypropan-2-yl)oxy)-propan-2-amine, 1-((1-butoxypropan-2-yl)oxy)-propan-2-amine, 1-((1-pentyloxypropan-2-yl)oxy)-propan-2-amine, and 1-((1-hexyloxypropan-2-yl)oxy)-propan-2-amine,
(f) 2-[2-(2-methoxy-ethoxy)-ethoxy]-ethylamine; 2-[2-(2-ethoxy-ethoxy)-ethoxy]-ethylamine; 2-[2-(2-propoxy-ethoxy)-ethoxy]-ethylamine; 2-[2-(2-butoxy-ethoxy)-ethoxy]-ethylamine; 2-[2-(2-pentyloxy-ethoxy)-ethoxy]-ethylamine; 2-[2-(2-hexyloxy-ethoxy)-ethoxy]-ethylamine; and
(g) 1-(((1-methoxy(propan-2-yl)oxy)-propan-2-yl)oxy)-propan-2-amine, 1-(((1-ethoxy(propan-2-yl)oxy)-propan-2-yl)oxy)-propan-2-amine, 1-(((1-propoxy(pro-pan-2-yl)oxy)-propan-2-yl)oxy)-propan-2-amine, 1-(((1-butoxy(propan-2-yl)oxy)-propan-2-yl)oxy)-propan-2-amine, 1-(((1-pentyloxy(propan-2-yl)oxy)-propan-2-yl)oxy)-propan-2-amine, and 1-(((1-hexyloxy(propan-2-yl)oxy)-propan-2-yl)oxy)-propan-2-amine.

8. The method of claim 7, wherein the compound is selected from the group consisting of:

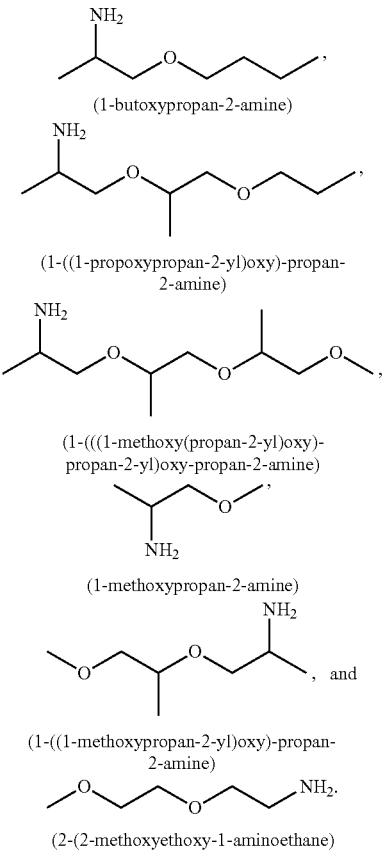

9. The method of claim 1 wherein the compound is present in the composition in an amount in the range of 0.01 to 5% (wt).

10. The method of claim 1 wherein the composition comprises water in an amount of at least 20% (wt), wherein the water is not from the foodstuff.

11. The method of claim 1 comprising removing water and the compound from the composition after processing.

12. The method of claim 1 wherein the foodstuff is a vegetable, fruit, or plant.

13. The method of claim 12 wherein the foodstuff is or derived from a plant selected from the group consisting of (a) peas, corn, potatoes, beans, rice, wheat, cassava, beans, sweet potatoes, yams, sorghum, and plantain, or from the group consisting of (b) beets, chickpeas, soya beans, alfalfa sprouts, navy beans, haricot beans, and kidney beans.

14. The method of claim 1, wherein processing comprises washing the foodstuff.

15. The method of claim 1 wherein processing comprises one or more of the following actions selected from the group consisting of (a) cutting, chopping, grating, slicing, peeling, julienning, mincing, dicing, diffusing, and shredding, or from the group consisting of (b) blending, pureeing, beating, liquidizing, mashing, whisking, crushing, juicing, and grinding.

16. The method claim 1 wherein processing comprises crystalizing or purifying, or wherein processing comprises fermenting.

17. The method of claim 1
wherein processing comprises processing the foodstuff in a foodstuff processor by one or more of washing, cutting, chopping, grating, slicing, peeling, julienning, mincing, dicing, shredding, blending, pureeing, beating, liquidizing, mashing, whisking, crushing, juicing, grinding, and fermenting the foodstuff to a processed foodstuff in the presence of the foam control compound;
holding the processed foodstuff in a container,
separating the foam control compound from the processed foodstuff in a separator mechanism.

18. The method of claim 1 wherein forming comprises adding the compound of Formula I to water and the foodstuff, wherein the compound of Formula I is added in the form of a stock composition including one or more compatible solvents, the compound of Formula I being present in the stock composition in an amount in the range of 30% (wt) to 99% (wt), or the compound of Formula I is added to water and the foodstuff in neat form.

19. The method of claim 9 wherein the compound is present in the composition in an amount in the range of 0.1 to 1% (wt).

20. The method of claim 1, wherein the composition has less than 10% (wt), or less than 5% (wt) of solids that are different than the foodstuff and the compound of Formula I.

21. The method of claim 1, wherein the compound of Formula I reduces an amount of foam formation by at least about 10%, or by at least about 20%, as compared to a composition that does not include the compound of Formula I.

22. The method of claim 1 wherein an aqueous composition is formed comprising the compound of Formula I and water, and
the composition is formed by adding the aqueous composition to the foodstuff.

23. A method for controlling foam while processing a foodstuff, comprising:
forming a composition comprising a foodstuff and a compound that has a number of carbon atoms in the range of 3 to 34, a number of ether oxygens in the range of 1 to 6, and an amine moiety, wherein the compound is a compound of Formula I:

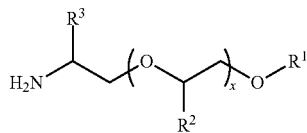

wherein $R^1$ is a monovalent carbon-containing group has a number of carbon atoms in the range of 1 to 10; $R^2$ is hydrogen, methyl, or ethyl; $R^3$ is hydrogen, methyl, or ethyl; and x is 0 to 5;
wherein forming comprises adding the compound of Formula I to water and the foodstuff, wherein the compound of Formula I is added in the form of a stock composition including one or more compatible solvents, the compound of Formula I being present in the stock composition in an amount in the range of 30% (wt) to 99% (wt), or the compound of Formula I is added to water and the foodstuff in neat form; and processing the composition, wherein the compound controls foam while processing the composition, as compared to a composition that is the same but that does not include the compound of Formula I.

24. A method for controlling foam while processing a foodstuff, comprising:
forming a composition comprising a foodstuff and a compound selected from any of the following groups:
(a) 2-methoxyethylamine, 2-propoxyethylamine, 2-butoxyethylamine, 2-pentyloxyethylamine, 2-hexyloxyethylamine, 2-septyloxyethylamine, and 2-octyloxyethylamine;
(b) 1-methoxypropan-2-amine, 1-ethoxypropan-2-amine, 1-propoxypropan-2-amine, 1-butoxypropan-2-amine, 1-pentyloxypropan-2-amine, 1-hexyloxypropan-2-amine, 1-septyloxypropan-2-amine, and 1-octyloxypropan-2-amine;
(c) 2-(2-methoxyethoxy)-1-aminoethane, 2-(2-ethoxyethoxy)-1-aminoethane, 2-(2-propoxyethoxy)-1-aminoethane, 2-(2-butoxyethoxy)-1-aminoethane, 2-(2-pentyloxyethoxy)-1-aminoethane, and 2-(2-hexyloxyethoxy)-1-aminoethane;
(d) 1-(1-methoxyethoxy)-propan-2-amine, 1-(1-ethoxyethoxy)-propan-2-amine, 1-(1-propoxyethoxy)-propan-2-amine, 1-(1-butoxyethoxy)-propan-2-amine, 1-(1-pentyloxyethoxy)-propan-2-amine, and 1-(1-hexyloxyethoxy)-propan-2-amine;
(e) 1-((1-methoxypropan-2-yl)oxy)-propan-2-amine, 1-((1-ethoxypropan-2-yl)oxy)-propan-2-amine, 1-((1-propoxypropan-2-yl)oxy)-propan-2-amine, 1-((1-butoxypropan-2-yl)oxy)-propan-2-amine, 1-((1-pentyloxypropan-2-yl)oxy)-propan-2-amine, and 1-((1-hexyloxypropan-2-yl)oxy)-propan-2-amine,
(f) 2-[2-(2-methoxy-ethoxy)-ethoxy]-ethylamine; 2-[2-(2-ethoxy-ethoxy)-ethoxy]-ethylamine; 2-[2-(2-propoxy-ethoxy)-ethoxy]-ethylamine; 2-[2-(2-butoxyethoxy)-ethoxy]-ethylamine; 2-[2-(2-pentyloxyethoxy)-ethoxy]-ethylamine; 2-[2-(2-hexyloxyethoxy)-ethoxy]-ethylamine; and
(g) 1-(((1-methoxy(propan-2-yl)oxy)-propan-2-yl)oxy)-propan-2-amine, 1-(((1-ethoxy(propan-2-yl)oxy)-propan-2-yl)oxy)-propan-2-amine, 1-(((1-propoxy(propan-2-yl)oxy)-propan-2-yl)oxy)-propan-2-amine, 1-(((1-butoxy(propan-2-yl)oxy)-propan-2-yl)oxy)-propan-2-amine, 1-(((1-pentyloxy(propan-2-yl)oxy)-propan-2-yl)oxy)-propan-2-amine, and 1-(((1-hexyloxy(propan-2-yl)oxy)-propan-2-yl)oxy)-propan-2-amine; and
processing the composition, wherein the compound controls foam while processing the composition.

25. A food product precursor composition comprising a foodstuff that is a vegetable, fruit, edible plant, or grain subjected to of one or more of washing, cutting, chopping, grating, slicing, peeling, julienning, mincing, dicing, shredding, blending, pureeing, beating, liquidizing, mashing, whisking, crushing, juicing, grinding, and fermenting;
a compound that has a number of carbon atoms in the range of 3 to 34, a number of ether oxygens in the range of 1 to 6, and an amine moiety, that is a compound of Formula I:

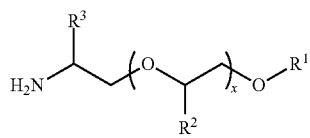

wherein $R^1$ is a monovalent carbon-containing group having 1 to 10 carbon atoms; $R^2$ is hydrogen, methyl, or ethyl; $R^3$ is hydrogen, methyl, or ethyl; and x is 0 to 5; and water in an amount of at least 20% (wt), wherein the water is not from the foodstuff, wherein the composition does not include a silicon-based polymer.

* * * * *